(12) United States Patent
Kim et al.

(10) Patent No.: US 12,386,778 B2
(45) Date of Patent: Aug. 12, 2025

(54) PIM-BASED COMPUTING DEVICE FOR ACCELERATING JOIN OPERATION

(71) Applicant: University Industry Foundation, Yonsei University, Seoul (KR)

(72) Inventors: Youngsok Kim, Seoul (KR); Chaemin Lim, Seoul (KR); Hanjun Kim, Seoul (KR); Jinho Lee, Seoul (KR)

(73) Assignee: UNIVERSITY INDUSTRY FOUNDATION, YONSEI UNIVERSITY, Seoul (KR)

(*) Notice: Subject to any disclaimer, the term of this patent is extended or adjusted under 35 U.S.C. 154(b) by 64 days.

(21) Appl. No.: 18/243,355

(22) Filed: Sep. 7, 2023

(65) Prior Publication Data

US 2024/0354278 A1    Oct. 24, 2024

(30) Foreign Application Priority Data

Apr. 18, 2023    (KR) .................. 10-2023-0050666

(51) Int. Cl.
*G06F 15/78* (2006.01)
*G06F 16/245* (2019.01)
*G06F 16/2455* (2019.01)

(52) U.S. Cl.
CPC ...... *G06F 15/7821* (2013.01); *G06F 16/2456* (2019.01); *G06F 16/24569* (2019.01)

(58) Field of Classification Search
CPC ............. G06F 15/7821; G06F 16/2456; G06F 16/24569; G06F 9/3004; G06F 9/30029; G06F 9/30065; G06F 12/0848; G06F 16/284; G11C 5/025; Y02D 10/00
See application file for complete search history.

(56) References Cited

U.S. PATENT DOCUMENTS

| | | | |
|---|---|---|---|
| 10,659,396 B2* | 5/2020 | Nicol | H04L 47/2475 |
| 11,442,851 B2* | 9/2022 | Yoon | G06F 12/1027 |
| 2023/0195459 A1* | 6/2023 | Puthoor | G06F 15/7821 |
| | | | 712/225 |
| 2023/0205693 A1* | 6/2023 | Kotra | G06F 12/0811 |
| | | | 711/122 |
| 2024/0161850 A1* | 5/2024 | Kim | G11C 29/1201 |
| 2024/0256185 A1* | 8/2024 | Pathiyakkara Thombra | |
| | | | G06F 3/0679 |
| 2024/0264863 A1* | 8/2024 | Yang | G06F 9/3836 |
| 2024/0330171 A1* | 10/2024 | Heo | G11C 7/1006 |

FOREIGN PATENT DOCUMENTS

KR  10-2022-0094180 A  7/2022
WO  WO-2023041002 A1 *  3/2023

* cited by examiner

*Primary Examiner* — Reginald G Bragdon
*Assistant Examiner* — Zakaria Mohammed Belkhayat
(74) *Attorney, Agent, or Firm* — Paratus Law Group, PLLC

(57) ABSTRACT

A processing-in-memory (PIM)-based computing device includes a main memory configured to store first and second data sets, a PIM module configured as an in-line memory module including a memory processor, a working memory, and a memory bank, the memory processor being connected to the working memory and performing a join operation on the first and second data sets loaded into the working memory, and a processor configured to form first and second channels with the main memory and the PIM module, import the first and second data sets through the first channel, and store the first and second data sets in the memory bank through the second channel.

15 Claims, 19 Drawing Sheets

PIM-BASED COMPUTING DEVICE FOR ACCELERATING JOIN OPERATION

CROSS-REFERENCE TO PRIOR APPLICATION

This application claims priority to Korean Patent Application No. 10-2023-0050666 (filed on Apr. 18, 2023), which is hereby incorporated by reference in its entirety.

ACKNOWLEDGEMENT

The present patent application has been filed as a research project as described below.
[National Research and Development Project Supporting the Present Invention]
  [Project Serial No] 1711193986
  [Project No] 2020-0-01361-004
  [Department] Ministry of Science and ICT
  [Project management (professional) institution] Institute of Information & Communications Technology Planning & Evaluation
  [Research project name] Information & Communication Broadcasting Research Development Project
  [Research Task Name] Artificial Intelligence Graduate School Support Project (Yonsei University)
  [Contribution rate] ½
  [Project Performing Institute] University Industry Foundation, Yonsei University
  [Research Period] 2023.01.01~2023.12.31
[National Research and Development Project Supporting the Present Invention]
  [Project Serial No] 1711193187
  [Project No] 2021-0-00853-003
  [Department] Ministry of Science and ICT
  [Project management (professional) institution] Institute of Information & Communications Technology Planning & Evaluation
  [Research project name] New concept PIM semiconductor leading technology development
  [Research Task Name] SW platform development for PIM utilization
  [Contribution rate] ½
  [Project Performing Institute] University Industry Foundation, Yonsei University
  [Research period] 2023.01.01~2023.12.31

BACKGROUND

The present disclosure relates to a processing-in-memory (PIM)-based computing technology, and more particularly, to an acceleration technique capable of improving join operation performance in PIM hardware.

Processing-in-memory (PIM) is a next-generation semiconductor formed by integrating a memory and a processor operator into a single chip. Through this, a problem of data bottleneck and excessive power consumption occurring in the existing computing structure in which a memory and a processor are separated may be solved.

A PIM-enabled dual in-line memory module (hereinafter referred to as DIMM) includes an in-DIMM processor (IDP) installed near a memory bank. PIM-enabled DIMMs allow applications to offload computation from a host CPU to the IDP. IDPs may perform computation by directly accessing data stored in memory banks without using host-side resources. In this manner, the PIM-enabled DIMMs may reduce the amount of data transfer between the CPU and main memory and significantly help applications overcome data bottlenecks by utilizing a high internal memory bandwidth and computational throughput of the PIM-enabled DIMMs.

Meanwhile, techniques for accelerating relational operations using the PIM-enabled DIMMs have been proposed to improve performance of relational database management systems (RDBMS). The related arts relied on PIM hardware simulators and architectural assumptions regarding PIM hardware. However, the architectural assumptions of the related art are different from the architecture of the PIM-enabled DIMM, and thus, the architectural assumptions of the related art may not be compatible with the DIMM.

Therefore, realizing the high potential of PIM in actual computing systems requires a new join algorithm optimized for PIM-enabled DIMMs.

RELATED ART DOCUMENT (Patent document 1) Korean Application Publication No. 10-2022-0094180 (2022.07.05)

SUMMARY

In view of the above, the present disclosure provides a processing-in-memory (PIM)-based computing device for join operational acceleration, in which an in-dual in-line memory module (DIMM) processor (IDP) maximizes join throughput and a PIM-enabled DIMM, instead of a CPU, performs global partitioning of two tables, thereby utilizing a high internal memory band width and computation throughput of the PIM-enabled DIMM and optimizing communication between all-to-all IDPs, as a join operational acceleration technique of PIM compatible with DIMM architecture.

According to embodiments of the present disclosure, a processing-in-memory (PIM)-based computing device includes: a main memory configured to store first and second data sets; a PIM module configured as an in-line memory module including a memory processor, a working memory, and a memory bank, the memory processor being connected to the working memory and performing a join operation on the first and second data sets loaded into the working memory; and a processor configured to form first and second channels with the main memory and the PIM module, import the first and second data sets through the first channel, and store the first and second data sets in the memory bank through the second channel.

The PIM module may implement the in-line memory module as a plurality of dual in-line memory modules to supports a scale-out join operation.

The PIM module may sub-group the plurality of dual in-line memory modules and connects the sub-group of the plurality of dual in-line memory modules to one of the second channels.

The PIM module may perform global partitioning through inter data relocation between the plurality of dual in-line memory modules to arrange the first and second data sets.

The PIM module may perform a rotate-and-stream (RnS) operation on data in the memory bank of each of the plurality of dual in-line memory modules in the inter data relocation process.

The PIM module may perform the RnS operation by transmitting and receiving a specific data set in units of data sets between the plurality of dual in-line memory modules.

The processor may perform an unordered scatter-gather (USG) operation on the first and second data sets in the main memory before performing the global partitioning and store the corresponding first and second data sets in the memory bank.

The processor may distribute the first and second data sets to the memory bank by performing stream transpose send (STS) procedures in the USG operation process.

The memory processor may select hash join, sort-merge join, or nest-loop join as the join operation.

The memory processor may generate a hash table in the working memory, performs local partitioning by loading the first and second data sets in the memory bank into the working memory, and perform hash join by associating the corresponding first and second data sets with the hash table using a hash function.

The memory processor may perform sort-merge join by performing range partitioning, parallel in-place sort, and parallel merge on the first and second data sets in the memory bank.

The memory processor may perform nest-loop join by loading the first and second data sets in the memory bank into the working memory and independently performing an internal loop operation for each set.

According to embodiments of the present disclosure, a processing-in-memory (PIM)-based computing device includes: a main memory configured to store first and second raw data sets; a plurality of processing-in-memory (PIM) modules each configured as an in-line memory module including a memory processor, a working memory, and a memory bank, the memory processor being connected to the working memory and performing a join operation on first and second processing data sets loaded into the working memory; and a processor configured to preprocess the first and second raw data sets and store the preprocessed first and second raw data sets in the memory bank.

The processor may perform an unordered scatter-gather (USG) operation on the first and second raw data sets in the main memory and store the corresponding first and second raw data sets in the memory bank.

The plurality of PIM modules may arrange the first and second processing data sets through inter data relocation for the preprocessed first and second raw data sets.

The plurality of PIM modules may perform a rotate-and-stream (RnS) operation on the preprocessed first and second raw data sets in the inter data relocation process.

The disclosed technology may have the following effects. However, it does not mean that a specific embodiment should include all of the following effects or only the following effects, and therefore, it should be understood that the scope of the disclosed technology is not limited thereby.

In the processing-in-memory (PIM)-based computing device for join operational acceleration according to the present disclosure, the in-dual in-line memory module (DIMM) processor (IDP) maximizes join throughput and the PIM-enabled DIMM, instead of a CPU, performs global partitioning of two tables, thereby utilizing a high internal memory band width and computation throughput of the PIM-enabled DIMM and optimizing communication between all-to-all IDPs, as a join operational acceleration technique of PIM compatible with DIMM architecture.

DETAILED DESCRIPTION

Figure 1:
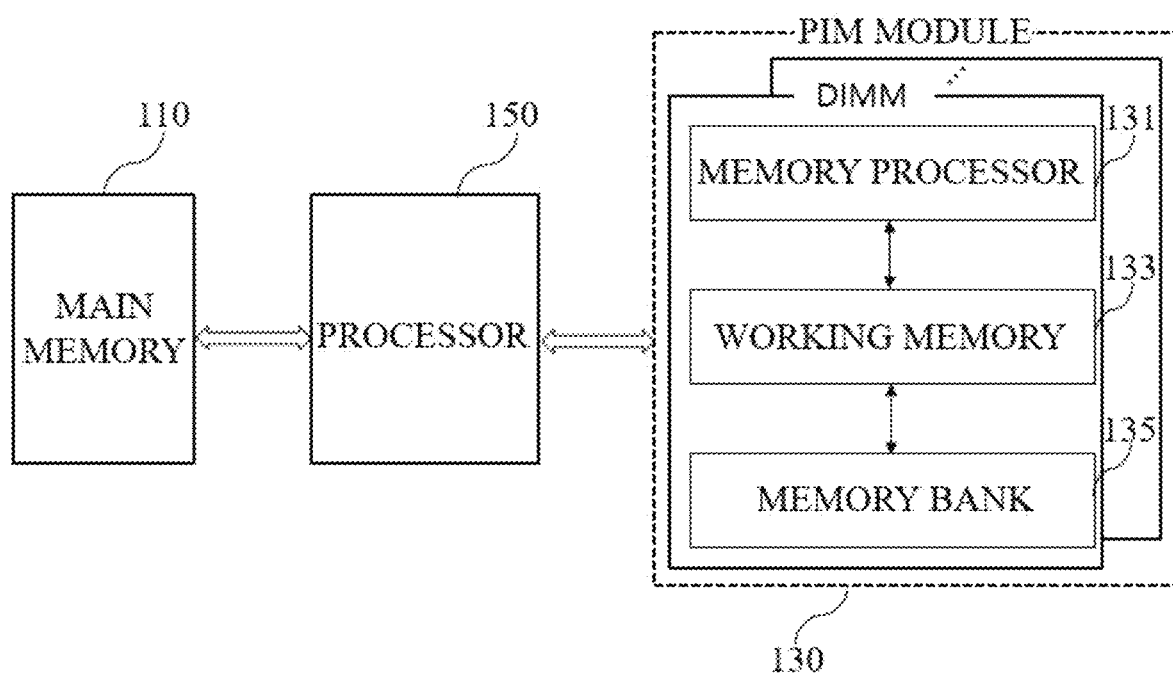
FIG. 1 is a diagram illustrating a processing-in-memory (PIM)-based computing device according to an embodiment of the present disclosure.

Description of the present disclosure is merely an embodiment for structural or functional explanation, so the scope of the present disclosure should not be construed to be limited to the embodiments explained in the embodiment. That is, since the embodiments may be implemented in several forms without departing from the characteristics thereof, it also should be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

Terms described in the present disclosure may be understood as follows.

While terms, such as "first" and "second," etc., may be used to describe various components, such components have to not be understood as being limited to the above terms. For example, a first component may be named a second component and, similarly, the second component may also be named the first component.

It will be understood that when an element is referred to as being "connected to" another element, it may be directly connected to the other element or intervening elements may also be present. In contrast, when an element is referred to as being "directly connected to" another element, no intervening elements are present. In addition, unless explicitly described to the contrary, the word "comprise" and variations, such as "comprises" or "comprising," will be understood to imply the inclusion of stated elements but not the exclusion of any other elements. Meanwhile, other expressions describing relationships between components, such as "~between", "immediately~between" or "adjacent to ~" and "directly adjacent to ~" may be construed similarly.

Singular forms "a", "an" and "the" in the present disclosure are intended to include the plural forms as well, unless the context clearly indicates otherwise. It will be further understood that terms, such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

Identification letters (e.g., a, b, c, etc.) in respective steps are used for the sake of explanation and do not describe order of respective steps. The respective steps may be changed from a mentioned order unless specifically mentioned in context. Namely, respective steps may be performed in the same order as described, may be substantially simultaneously performed, or may be performed in reverse order.

Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present application.

FIG. 1 is a diagram illustrating a processing-in-memory (PIM)-based computing device according to an embodiment of the present disclosure.

Referring to FIG. 1, a PIM-based computing device 100 may be implemented to include a main memory 110, a PIM module 130 and a processor 150.

The main memory 110 may store first and second data sets.

The PIM module 130 is configured as an in-line memory module including a memory processor 131, a working memory 133, and a memory bank 135.

The memory processor 131 may be connected to the working memory 133 and may perform a join operation on the first and second data sets loaded into the working memory 133. The PIM module 130 may support a scale-out join operation by implementing the in-line memory module as a plurality of dual in-line memory modules (DIMMs). In an embodiment, a plurality of memory processors 131, working memories 133, and memory banks 135 may be interconnected to configure a set inside the DIMM.

The processor 150 may form first and second channels with the main memory 110 and the PIM module 130, import the first and second data sets through the first channel, and store the same in the memory bank 135 through the second channel.

The PIM module 130 may sub-group a plurality of dual in-line memory modules (DIMMs) and connect the same to one of the second channels. The PIM module 130 may arrange the first and second data sets by performing global partitioning through inter data relocation between the plurality of dual in-line memory modules (DIMMs).

The processor 150 may perform an unordered scatter-gather (USG) operation on the first and second data sets in the main memory 110 before performing global partitioning and store the same in the memory bank 135. The processor 150 may equally distribute the first and second data sets to the memory bank 135 through the USG operation. The processor 150 may distribute the first and second data sets to the memory bank 135 by performing a stream transpose send (STS) procedure during the USG operation.

Since the first and second data sets are placed properly through global partitioning, strict ordering is not required for the input and output data sets in the memory bank 135, and thus, the PIM module 130 has to equally distribute the first and second data sets across the memory processor 131. The USG may be implemented as a mechanism for equally distributing the first and second data sets to the memory bank 135. The processor 150 may perform stream on the first and second data sets in the main memory 110 during the USG calculation process, perform transpose, and then transmit the first and second data sets to the PIM module 130. The processor 150 may perform sequential access on both the main memory 110 and the PIM module 130 and equally distribute the first and second data sets to the memory bank 135.

The PIM module 130 may perform a rotate-and-stream (RnS) operation on data in the memory banks 135 of each of a plurality of dual in-line memory modules (DIMMs) during a process of inter data relocation. The PIM module 130 may perform the RnS operation by transmitting and receiving a specific data set in units of data sets between the plurality of dual in-line memory modules (DIMMs).

The memory processor 131 may select a hash join, a sort-merge join, or a nest-loop join as a join operation. In an embodiment, the memory processor 131 may generate a hash table in the working memory 133, loads the first and second data sets in the memory bank 135 to the working memory 133 to perform local partitioning, and then, performing a hash function by associating the first and second data sets with a hash table using a hash function. In an embodiment, the memory processor 131 may perform range partitioning, parallel in-place sort, and parallel merge on the first and second data sets in the memory bank 135 to perform a sort-merge join. In an embodiment, the memory processor 131 may load the first and second data sets in the memory bank 135 to the working memory 133 and independently performing an internal loop operation on each set to perform a nest-loop join.

The PIM-based computing device 100 may be implemented to include a plurality of PIM modules 130. In this case, each of the plurality of PIM modules 130 may be configured as an in-line memory module including the memory processor 131, the working memory 133 and the memory bank 135. The main memory 110 may store first and second raw data sets. The processor 150 may preprocess the first and second raw data sets and store the same in the memory bank 135. Here, the processor 150 may store the first and second raw data sets in the main memory 110 in the memory bank 135 that performs the USG operation as preprocessing. The memory processor 131 may perform a join operation on the first and second processed data sets loaded into the working memory 133.

The plurality of PIM modules 130 may arrange first and second processed data sets through inter data relocation with respect to the preprocessed first and second raw data sets. The plurality of PIM modules 130 may perform a Rotate-and-Stream (RnS) operation on the first and second raw data sets preprocessed in the process of inter data relocation.

Figure 2A:
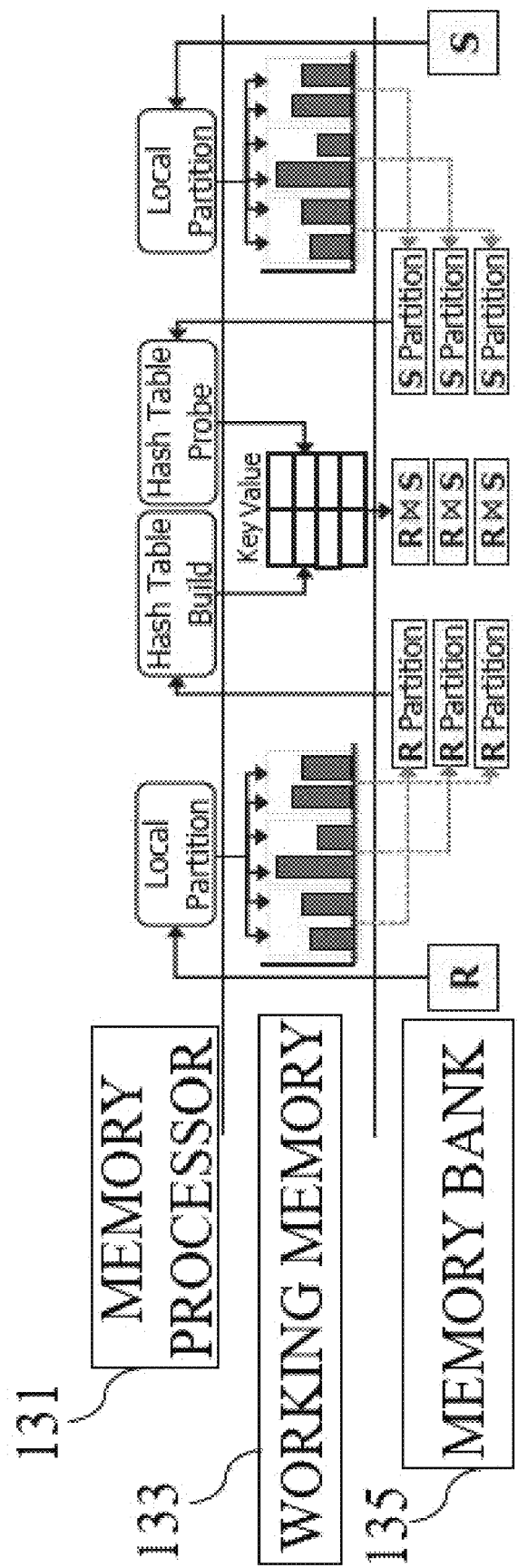
FIGS. 2A to 2C are diagrams illustrating a process of performing a join operation in a memory processor of FIG. 1.
Figure 2B:
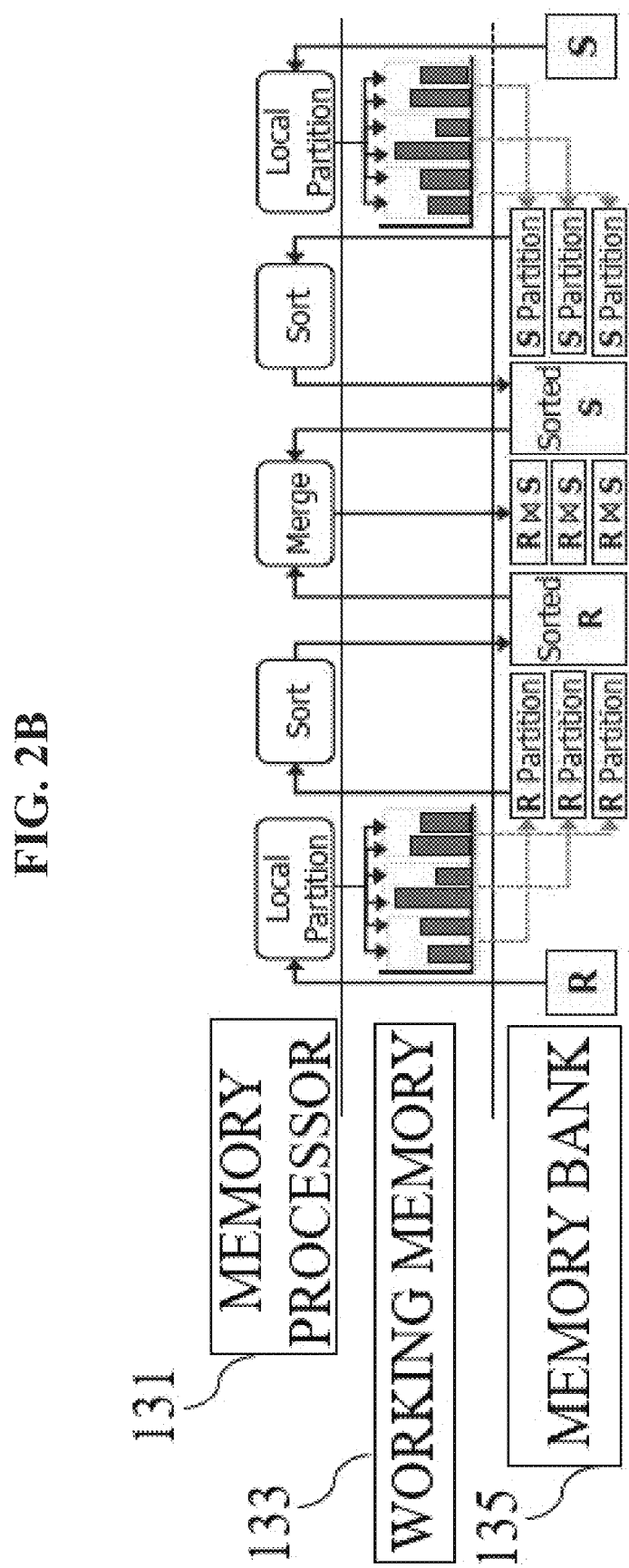
Figure 2C:
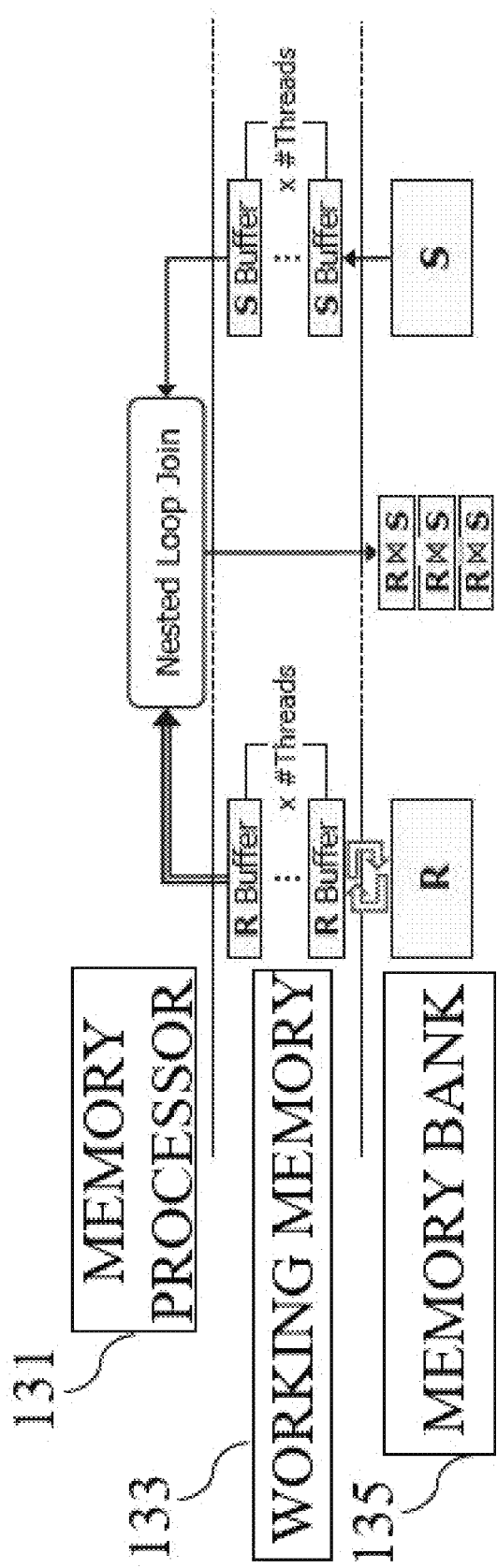

FIGS. 2A to 2C are diagrams illustrating a process of performing a join operation in the memory processor of FIG. 1.

Referring to FIGS. 2A to 2C, the memory processor 131 may perform a join operation on the first and second data sets loaded into the working memory 133. Here, the memory processor 131 may selectively perform a hash join, a sort-merge join, or a nest-loop join as a join operation.

The hash join performs a join on the first and second data sets using a hash table. Specifically, referring to FIG. 2A, the memory processor 131 generates a hash table in the working memory 133. The hash table consists of a key and value pair (key, value). Here, the key and value pair may correspond to a tupul ID of an R tuple which are a join key and a first data set, respectively. The memory processor 131 loads the first and second data sets R and S in the memory bank 135 into the work memory 133 and performs local partitioning. Thereafter, the memory processor 131 associates the hash table 210 with the hash function to perform a hash join. The memory processor 131 probes the hash table with an S tuple, which is the second data set, identifies an R tuple in the corresponding hash table entry, and checks whether the two tuples satisfy a given join predicate.

Since the hash table entry is frequently accessed during the process of performing the hash join, the memory processor 131 generates a hash table in the working memory, so that access does not occur on the slow memory bank 135.

The sort-merge join performs join by performing range partitioning, parallel in-place sort, and parallel merge on the first and second data sets R and S in the memory bank 135. Specifically, referring to FIG. 2B, the memory processor 131 performs a join operation by sorting R and S tuples, which are first and second data sets, and merging them. The memory processor 131 performs range partitioning to group tuples having the same join key value range to fit a working set in the working memory 133. Thereafter, the memory processor 131 allocates different partitions to different threads and performs the parallel in-place sort to sort the allocated partitions at the same time. At this time, the memory processor 131 uses an internal alignment algorithm so that a working set size does not exceed the working memory 133 capacity. Thereafter, the memory processor 131 merges the tuple of the S partition with the R partition.

The nest-loop join loads the first and second data sets in the memory bank 135 into the working memory 133 and independently performs an internal loop operation on each of the first and second data sets. Specifically, referring to FIG. 2C, an outer loop scans S tuples and an inner loop scans R tuples. The memory processor 131 checks the buffer amount of the working memory 133 required to store the R tuples and allocates a circular buffer to the working memory 133 to store the tuples in each thread. Then, the memory processor 131 loads the S tuples into the working memory 133, fills the circular buffer with R tuples, and performs a join on the R and S tuples.

Figure 3:
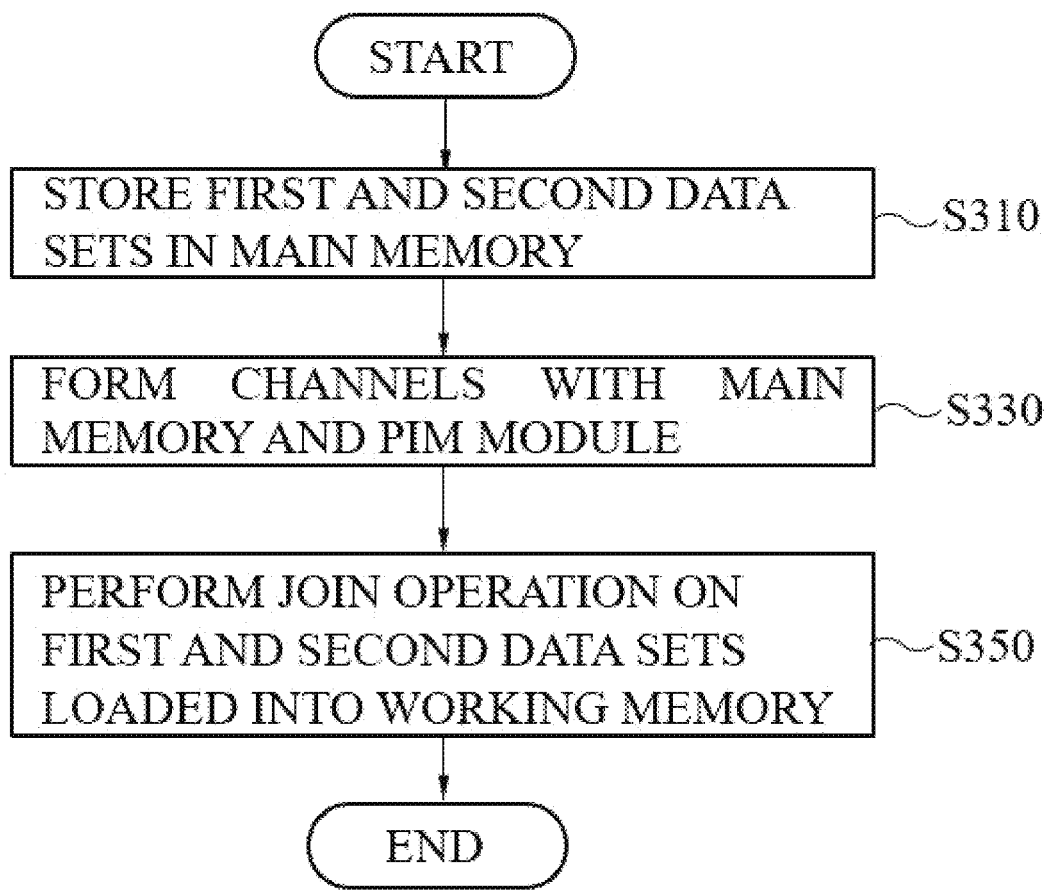
FIG. 3 is a flowchart illustrating an embodiment of a join operation method of a PIM-based computing device according to the present disclosure.

FIG. 3 is a flowchart illustrating an embodiment of a join operation method of a PIM-based computing device according to the present disclosure.

Referring to FIG. 3, the PIM-based computing device 100 may store first and second data sets in the main memory 110 (step S310).

The PIM-based computing device 100 may form channels with the main memory 110 and the PIM module 130 through the processor 150 (step S330). The processor 150 forms first and second channels with the main memory 110 and the PIM module 130, imports the first and second data sets through the first channel, and stores the first and second data sets in the memory bank 135 in the PIM module 130 through the second channel. The processor 150 may perform an USG operation on the first and second data sets in the main memory 110 and store the same in the memory bank 135.

The PIM-based computing device 100 may perform a join operation on the first and second data sets loaded from the memory processor 131 of the PIM module 130 into the working memory 135 (step S350). The PIM module 130 may be configured as an in-line memory module including the memory processor 131, the working memory 133, and the memory bank 135. The PIM module 130 may support a scale-out join operation by implementing the in-line memory module as a plurality of dual in-line memory modules. The PIM module 130 may arrange the first and second data sets by performing global partitioning through inter data relocation between the plurality of dual in-line memory modules. The PIM module may perform a RnS operation on data in the memory bank 135 of each of the plurality of dual in-line memory modules in the process of inter data relocation. The memory processor 131 of the PIM module 130 may selectively perform a hash join, a sort-merge join, or a nest-loop join as a join operation.

Hereinafter, a PIM-based computing device according to the present disclosure will be described in more detail with reference to FIGS. 4 to 17B.

Figure 4:
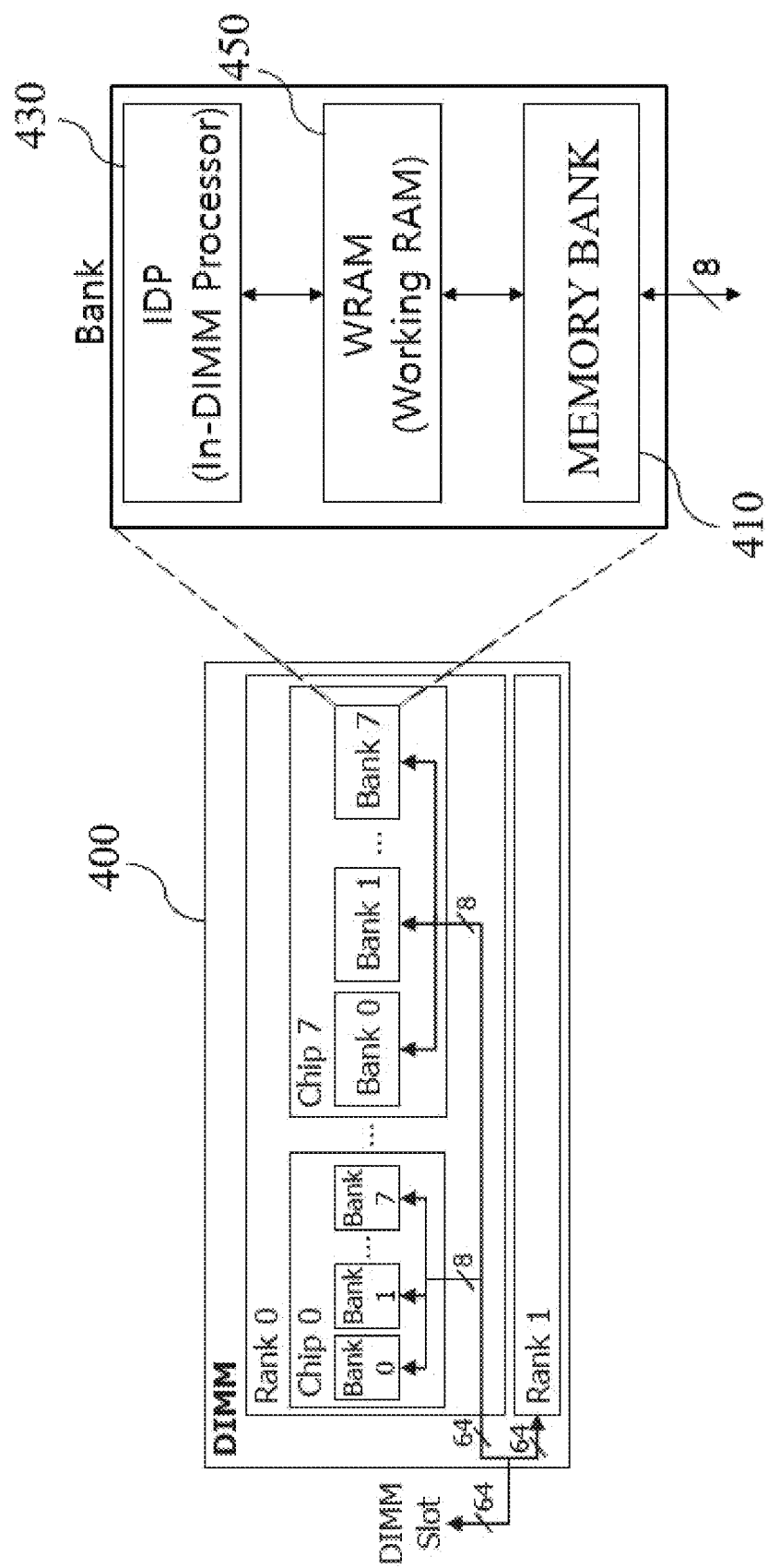
FIG. 4 is a diagram illustrating a PIM-enabled dual in-line memory module (DIMM) architecture.

FIG. 4 is a diagram illustrating a PIM-enabled dual in-line memory module architecture.

Referring to FIG. 4, a PIM-enabled dual in-line memory module (DIMM) 400 may support the PIM module 130 by connecting an in-DIMM Processor (IDP) 430 to a memory bank 410.

The DIMM 400 includes a plurality of chips, and each chip includes a plurality of banks. The DIMM 400 groups the chips into ranks and stores sequential data pieces in one of the ranks. Here, the rank refers to a set of chips sharing the same control signal. The DIMM 400 may implement PIM module 130 by connecting the IDP 430 to each 64 MB memory bank 410. The IDP 430 cannot directly access data stored in the memory bank 410 and has to load the data into a working memory (WRAM) 450.

Since each IDP 430 may only access data stored in the memory bank 410 by loading the data into the WRAM 450, each IDP 430 cannot directly access data stored in other memory banks. The processor 150, which is a host CPU, needs to transmit data between the memory banks 410 of different IDPs 430. Communication between these CPU-based IDPs 430 uses limited host CPU bandwidth and incurs significant performance overhead. The rank level parallel processing of the DIMM 400 may result in an increase in performance overhead without careful inter-IDP 430 communication optimization. When data is transmitted between the IDPs 430, all other IDPs belonging to the same rank of source and destination IDPs have to transmit data, and the IDPs of the corresponding ranks operate in a synchronous manner. Therefore, one of the optimization guidelines for efficiently utilizing the DIMM 400 is to minimize communication between IDPs.

In the present disclosure, a new PIM-enabled join algorithm (hereinafter referred to as 'PID-JOIN') utilizing architectural characteristics of the DIMM 400 is proposed to maximize join operation performance using PIM. The PID-JOIN scheme proposed in the present disclosure may be applied to an actual computing system to be evaluated.

The PID-JOIN scheme proposed in the present disclosure may perform a join operation on the first and second data sets. Here, the first and second data sets may correspond to R and S tuples, respectively. The R and S tuples are stored in the memory bank 410. With the join operation, three representative types of equi-join algorithms including hash join, sort-merge join, and nest-loop join may be prototyped and evaluated. After designing an algorithm, performance thereof may be compared with synthetic workloads and the best-performing algorithm may be selected. For performance comparison, it is assumed that the IDP 430 processes an equi-join query. It is also assumed that all keys are initially stored in the memory bank 410 and result tuples of the equi-join query are stored in the memory bank 410.

To achieve high join performance, a single IDP join algorithm has to be optimized for the following key architectural characteristics of the IDP. First, the IDP may access only data stored in the WRAM, so the algorithm has to fit a working set within the 64 KB capacity of WRAM. If the working set size exceeds the WRAM capacity, the IDP may undergo performance degradation due to frequent data transfers between the WRAM and memory banks. Second, the algorithm has to transmit large sequential data chunks, up to 2 KB or more in size, to maximize an internal memory bandwidth of the IDP. DRAM-based memory banks provide higher bandwidth for larger sequential data accesses, so WRAM has to be used to filter small or random data accesses. Third, due to limited computing capabilities of the IDP, the algorithm has to use operations (e.g., adding integers) that the IDP supports for underlying hardware. The IDP supports non-native operations, such as integer multiplication/division and floating point operations through emulation. However, the IDP achieves much lower computational throughput with non-native operations.

The hash join algorithm performs a join on two tables, that is, R and S by utilizing a hash table. The hash join algorithm first generates a hash table with tuples in R. The hash table includes a (key, value) pair. The key and value of the pair correspond respectively to the original join key and a tuple ID of the R tuple. The hash join algorithm then probes the hash table with a tuple in S, identifies a tuple in R from the corresponding hash table entry, and checks whether the two tuples satisfy a given join predicate.

To take full advantage of the architecture characteristics, the single IDP hash join algorithm generates a hash table in working memory, performs local partitioning in R in relation to the limited capacity of the working memory, and then builds a hash table for the partitions, retrieves, and processes each partition in R. If a single hash table including all the tuples in R is built, the hash table leaks into the memory bank, resulting in a memory bank access. The hash join algorithm may achieve high computational throughput by using an IDP-friendly hash function of operations that IDP natively supports. The hash join algorithm uses linear probes as a collision handling method.

Figure 5:
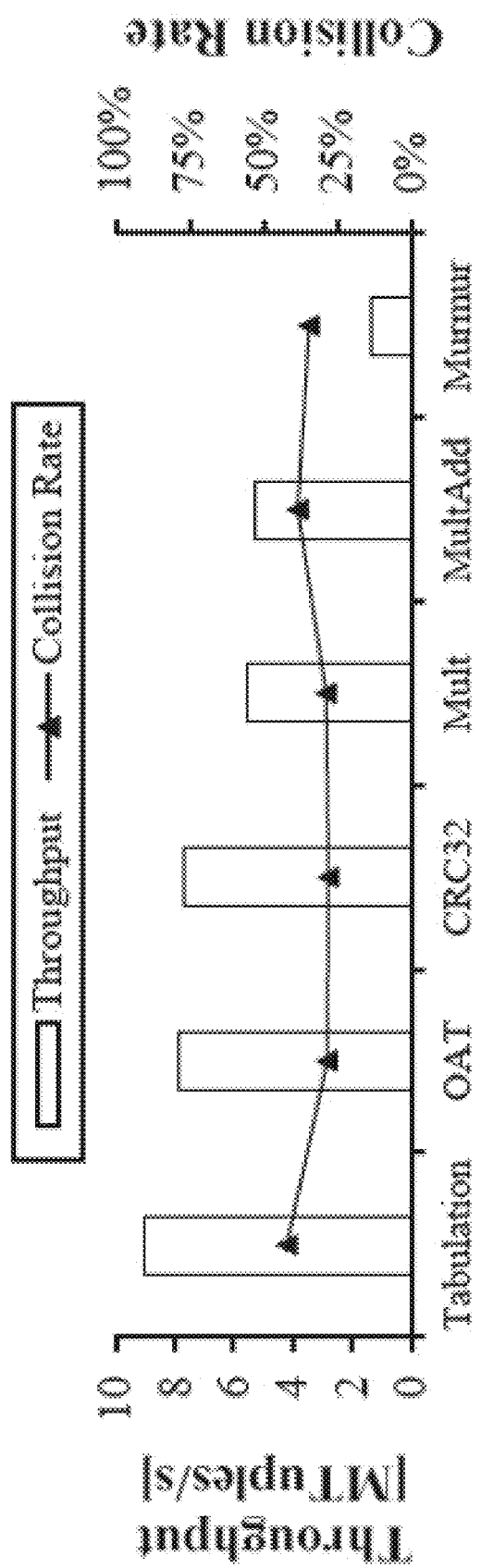
FIG. 5 is a diagram illustrating single-PID performance of various hash functions.

FIG. 5 is a diagram illustrating single-PID performance of various hash functions, illustrating hashing throughput and collision rate of the evaluated hash function.

Referring to FIG. 5, hash functions utilizing integer multiplication, i.e., multiple move (Mult), multiple additional move (MultAdd), and Murmur achieve low hash throughput due to the lack of native hardware support of the IDP. The other three hash functions, that is, Tabulation, OAT and CRC32, utilize XOR-based operations and thus achieve much higher hash throughput. In addition, as a result of comparing collision rates of hash functions by building a hash table with 128-K randomly generated tuples and measuring the number of hash collisions that occurred during search, OAT and CRC32 showed that they achieve lower collision rates than Tabulation. However, it was confirmed through additional measurements that as the hashing throughput of Tubulation was higher, the collision rate increased, resulting in a fastest speed.

A sort-merge-join algorithm first sorts the R and S tuples and then merges them. The sort-merge join algorithm used as a join operation in the present disclosure performs range partitioning, parallel in-place sorting, and parallel merge in relation to the structural characteristics of the IDP. Range partitioning is used to group tuples having the same join key value range to fit into a working set in WRAM. Range partitioning allows different partitions to have their own range of join key values, so the sorting of tuples in one partition is independent of the tuples in other partitions. Accordingly, after different partitions are allocated to different threads through parallel in-place sorting, the threads simultaneously sort the allocated partitions. In addition, an internal sorting algorithm is used to ensure that the working set size does not exceed the WRAM capacity. To merge R and S tuples, the sort-merge-join algorithm loads multiple R and S partitions into WRAM using multithreading support and then allocates the R partition to different threads in the IDP to merge tuples of one S partition into all R partitions. This algorithm uses quick sort.

The Nested-Loop join algorithm iterates and evaluates the join predicate on every pair of R and S tuples using a nested-loop. To maximize memory bank bandwidth, the nest-loop join algorithm of our company minimizes a data transfer between WRAM and the memory banks by allocating different amounts of WRAM to buffers that temporarily store R tuples depending on whether all tuples in R may fit in WRAM. When all tuples in R fit in WRAM, the nest-loop join algorithm allocates a WRAM buffer whose capacity matches the capacity of the tuples, loads all tuples in R into the buffer, and streams S tuples by utilizing the remaining WRAM buffer. Otherwise, the nest-loop join algorithm allocates most of WRAM to store the S tuples and uses the remaining WRAM as a circular buffer for R tuples.

The PID-JOIN scheme proposed in the present disclosure may compare join execution latencies of three single IDP join algorithms in a single IDP to identify a single IDP join algorithm having the highest performance.

Figure 6A:
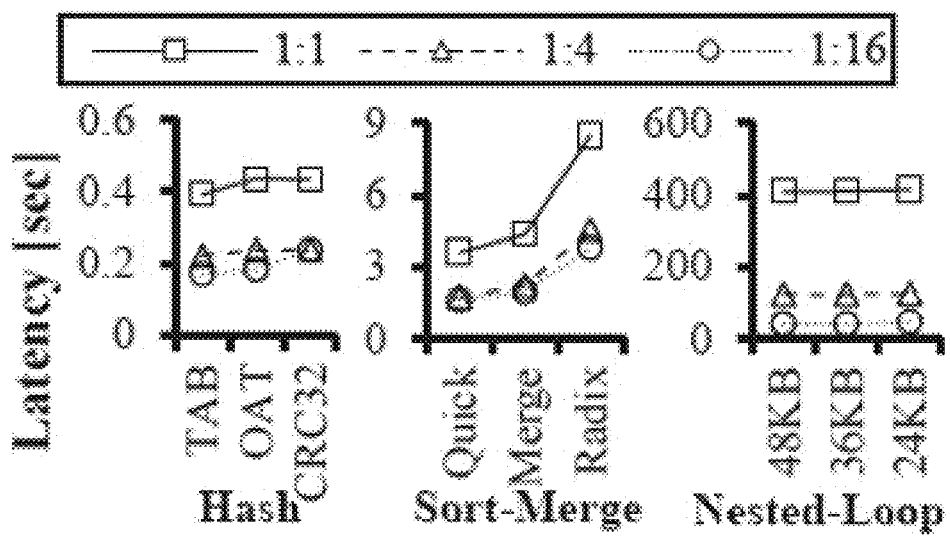
FIGS. 6A and 6B are diagrams illustrating join performance latency for each of hash join, sort-merge join, and nest-loop join algorithms.
Figure 6B:
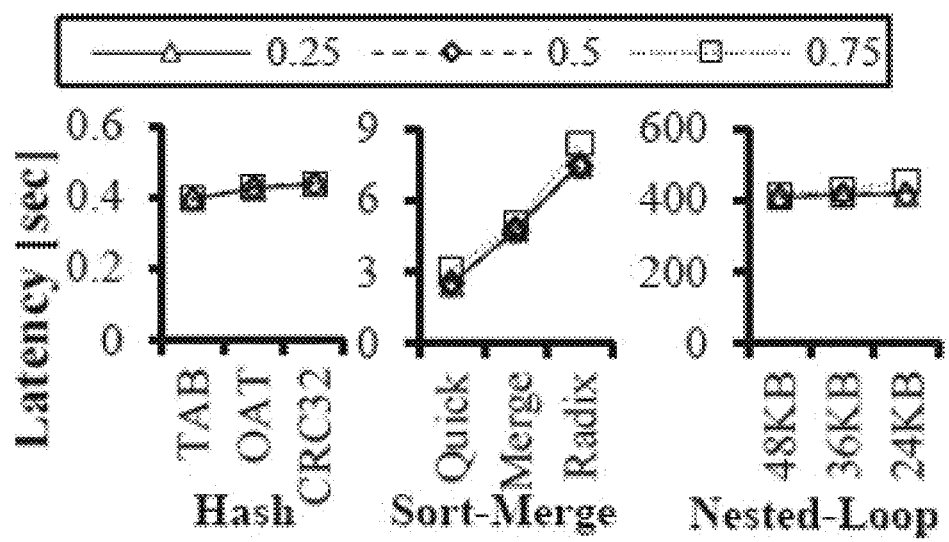

FIGS. 6A and 6B are diagrams illustrating join performance latency for each of hash join, sort-merge join, and nest-loop join algorithms. FIG. 6A illustrates a case of uniform S, and FIG. 6B illustrates a case of distorted S, respectively.

Referring to FIGS. 6A and 6B, the hash join algorithm was the fastest in all experiments and achieved the best performance by efficiently using WRAM and minimizing data transfer between WRAM and memory banks. Meanwhile, other join algorithms suffer from frequent memory bank accesses. In terms of the hash function, using TAB may speed up join processing compared to using OAT or CRC32. Tabulation achieves a higher collision rate than OAT and CRC32, but a higher hashing throughput may mitigate a penalty due to a higher collision rate.

To take full advantage of the PIM-enabled DIMM, the single IDP hash join algorithm has to be extended to a full rank of at least 64 IDPs. Rank level extension inevitably leads to partitioning problems. The single IDP join algorithm assumes that the entire R and S are stored in a memory bank. However, to scale to full rank, the table has to be first partitioned so that each IDP handles only one pair of R and S partitions and there are no dependencies between partitions. The partitioning step, also known as global partitioning, distributes tuples from two tables to IDPs so that all tuples belonging to the same hash key range belong to the same IDP.

Due to the shared-nothing architecture of IDPs, host CPU intervention is unavoidable for inter-IDP communication. This characteristics incurs a huge amount of overhead and becomes a performance bottleneck. Therefore, a major subject for fast inter-IDP communication is a layout of the data in the DIMM. Because of bytewise interleaving between multiple chips in a rank, a host CPU cannot interpret raw data from the PIM-enabled DIMM. To solve this, an existing kernel module of the DIMM may perform a byte-level transpose operation on every cache line received from the CPU, but it places a heavy computational burden on the CPU to cause the performance bottleneck.

The PID join method proposed in the present disclosure may perform RnS operation to solve the high latency and low bandwidth of existing inter-IDP communication. By slightly adjusting the partitioning behavior, a load on the CPU may be significantly by a single rotation. Also, rotation occurs within a single cache line. Through this, data for communication between IDPs may be stored only in registers without being transferred to the main memory, so there is no need for main memory access and vector streaming may be performed.

Figure 7:
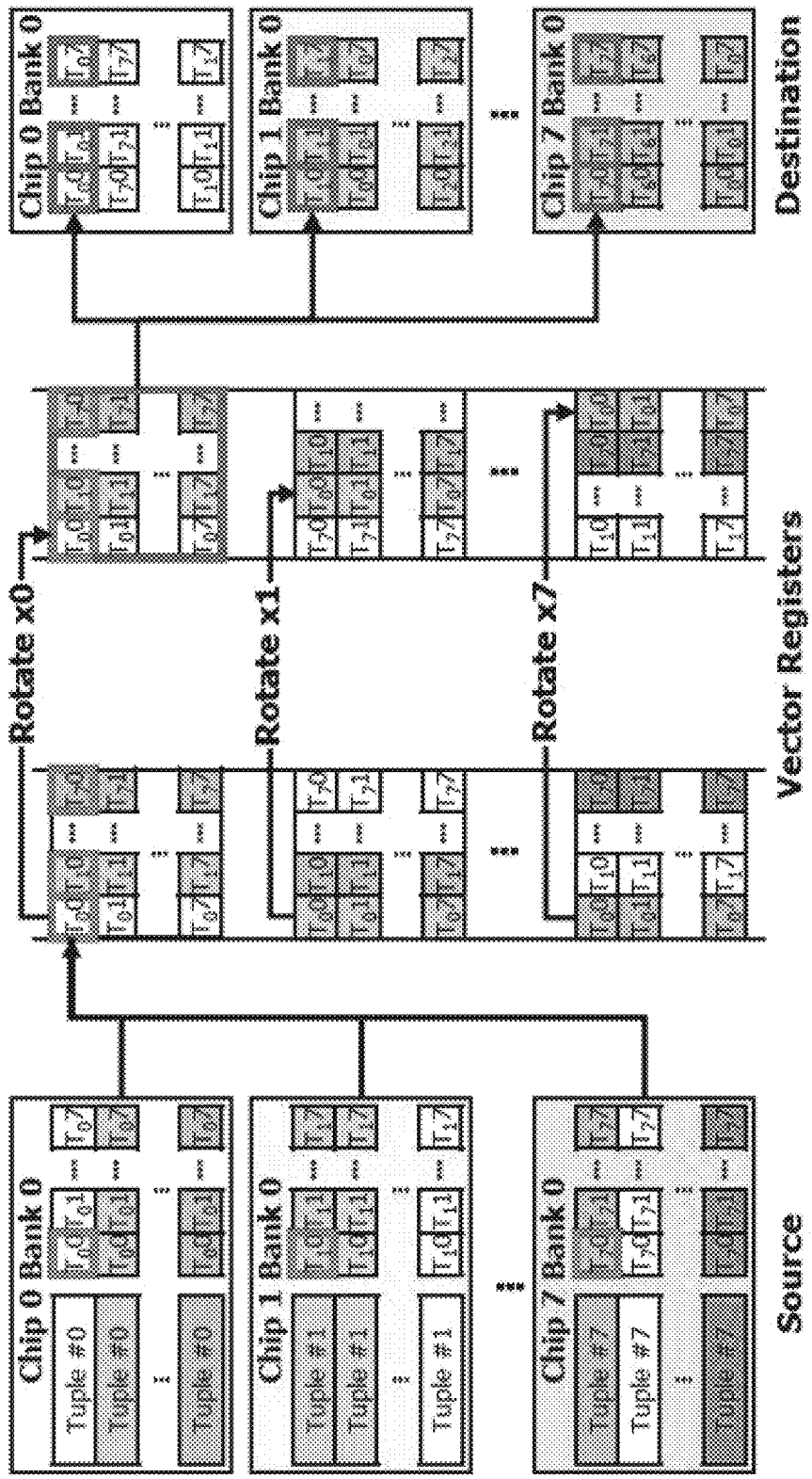
FIG. 7 is a diagram illustrating a process of performing a rotate-and-stream (RnS) operation.

FIG. 7 is a diagram illustrating a process of performing a RnS operation.

Referring to FIG. 7, RnS is shown along with an example of 8 IDPs each transmitting and receiving 8 8-byte tuples. A single tuple is transmitted and received between the 8 IDPs. In a partitioning step, each IDP constructs a partitioned storage in twisted order. Unlike the existing inter-IDP communication where partitioning bins are always sorted by a target chip ID starting from 0, in the case of RnS, bins targeting itself are first placed and then placed in ascending order. For example, the partitions of Chip 0 are stored in the order of 0, 1, 2, ..., 7, and the partitions of Chip 7 are stored in the order of 7, 0, 1, ..., 6. A single 64-byte cache line-sized data block is then read by the main processor without byte-level transposition. A cache line is byte-interleaved, including first 8 bytes of each of the 8 chips, but depicted as vertically aligned tuples of the same color. Thereafter, when bit rotation(s) are performed for each of 64-byte blocks (N-th chip is N-byte), inter-IDP communication may be finally performed simply by transferring the data to the PIM-enabled DIMM.

Rotation occurs within a 64-byte cache line, so it may fit into a 512-bit SIMD register. This allows efficient rotation using vector instructions and, more importantly, requires no main memory. Also, cache access overhead may also be minimized by streaming to the cache by a non-temporal streaming operation. Here, the RnS implementation loads 64-byte data from the PIM-enabled DIMM using a non-transient stream load instruction _mm512_stream_load_si512( ), which does not pollute the host CPU cache. Rotation is performed in place using the _mm512_rol_epi64( ) command. Then, when the data is written back to the DIMM, the data is not used in the cache and the stream store operation _mm512_stream_si512( ) which directly accesses the DIMM is used.

Figure 8:
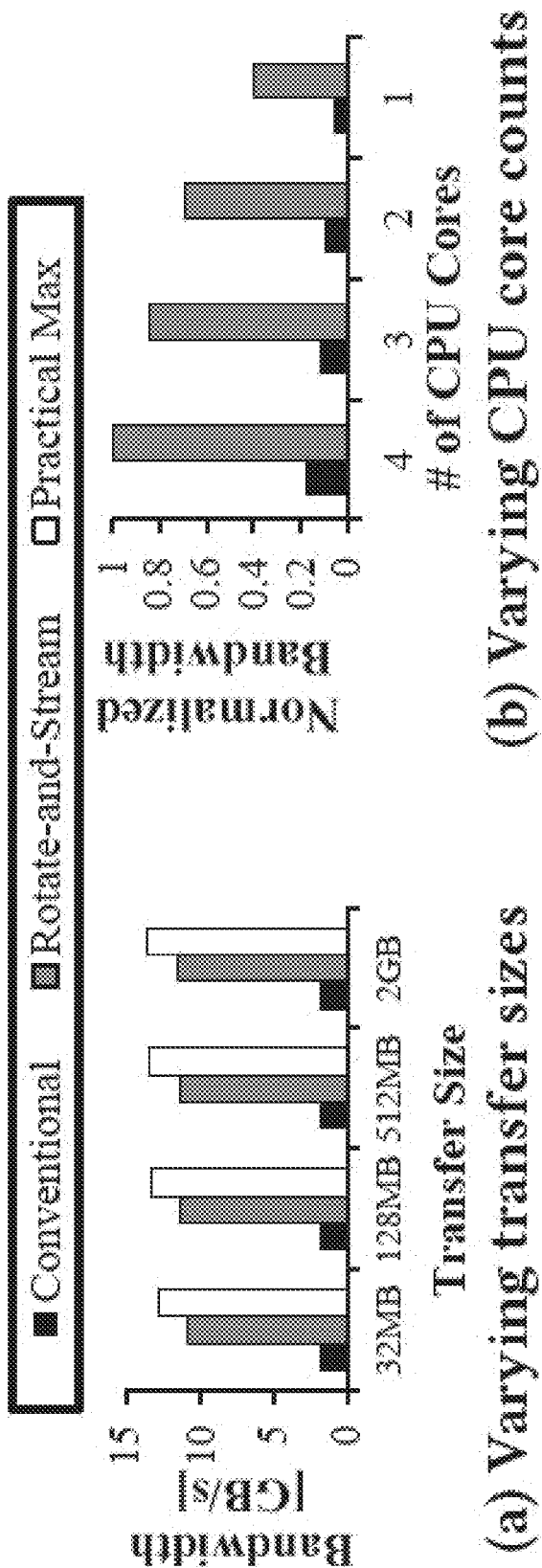
FIG. 8 is a diagram illustrating an inter-IDP communication bandwidth of RnS compared to the related art.

FIG. 8 is a diagram illustrating inter-IDP communication bandwidth of RnS compared to the related art.

(a) of FIG. 8 illustrates a bandwidth by changing the total amount of data transmitted between 64 IDPs of a single rank from 32 MB to 2 GB. In terms of bandwidth, RnS exhibits 6.23 times better than the conventional method in geometric mean because the computation amount of a host CPU is reduced and data is not leaked to the main memory. (b) of FIG. 8 illustrates how the performance deteriorates when the number of usable CPU cores decreases. Since RnS is less dependent on the CPU, it is less sensitive to available computational resources than the existing inter-IDP communication. To perform RnS, data to be transmitted by each IDP has to be prepared in units of packets. To utilize the PIM-enabled DIMM, communication between single-rank IDPs has to be extended to multiple ranks and DIMMs. The PID-JOIN scheme proposed in the present disclosure may take a parallel RnS approach.

The PID-JOIN scheme proposed in the present disclosure does not require a strict order for the input and output tuples in the memory bank of the DIMM because global partitioning places them in a correct IDP. In the PID-JOIN scheme, the R and S tuples are evenly distributed across the IDP. The PID-JOIN scheme implements the USG operation, a mechanism that equally distributes R and S tuples to the IDP, without requiring random access to the main memory.

Figure 9:
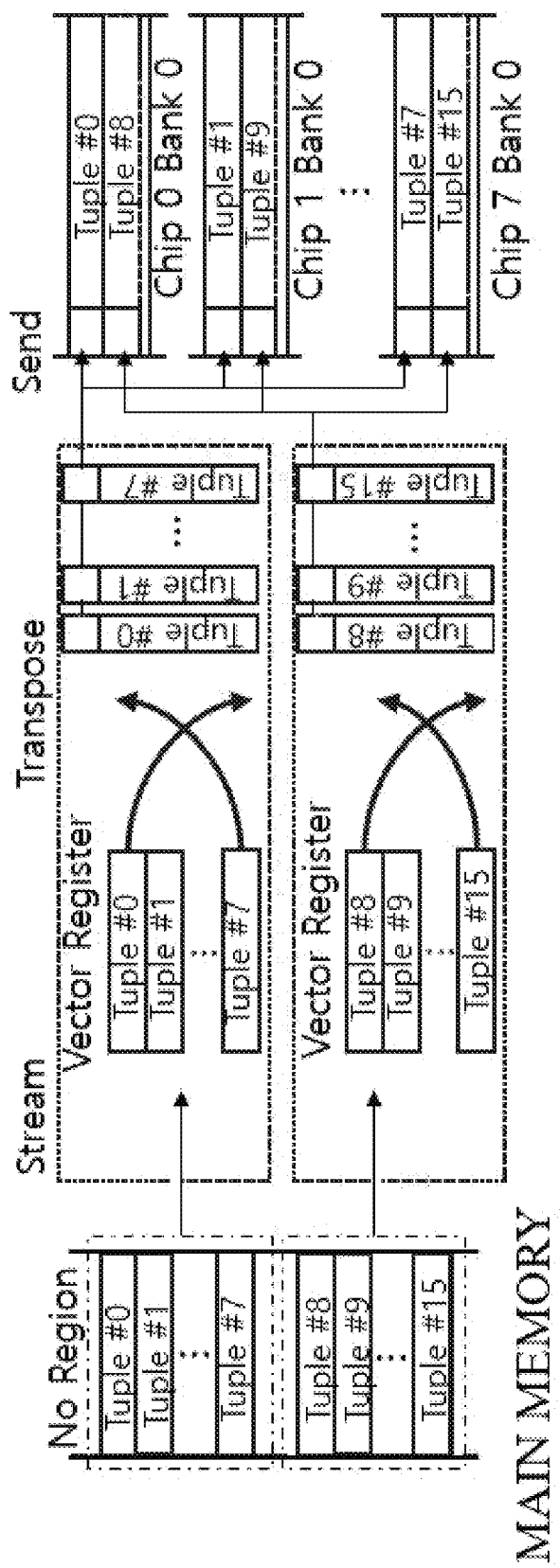
FIG. 9 is a diagram illustrating a process of performing an unordered scatter-gather (USG) operation.

FIG. 9 is a diagram illustrating a process of performing an USG operation, and particularly, illustrates a scattering process.

Referring to FIG. 9, a working model of the USG directly loads a 64-byte tuple into a 512-bit vector register in a streaming manner to eliminate unnecessary small loads in various regions of the main memory. The working model of the USG then simply performs a byte-level transposition and transmit the same to the PIM-enabled DIMM, thereby completing the transmission. The existing IDP data transmission has a limitation that tuples have to be transmitted to the correct destination IDP, whereas USG does not include region division. As a result, the USG perform sequential access to both the main memory and the PIM-enabled DIMM, while tuples may be evenly distributed to the IDP.

Figure 10:
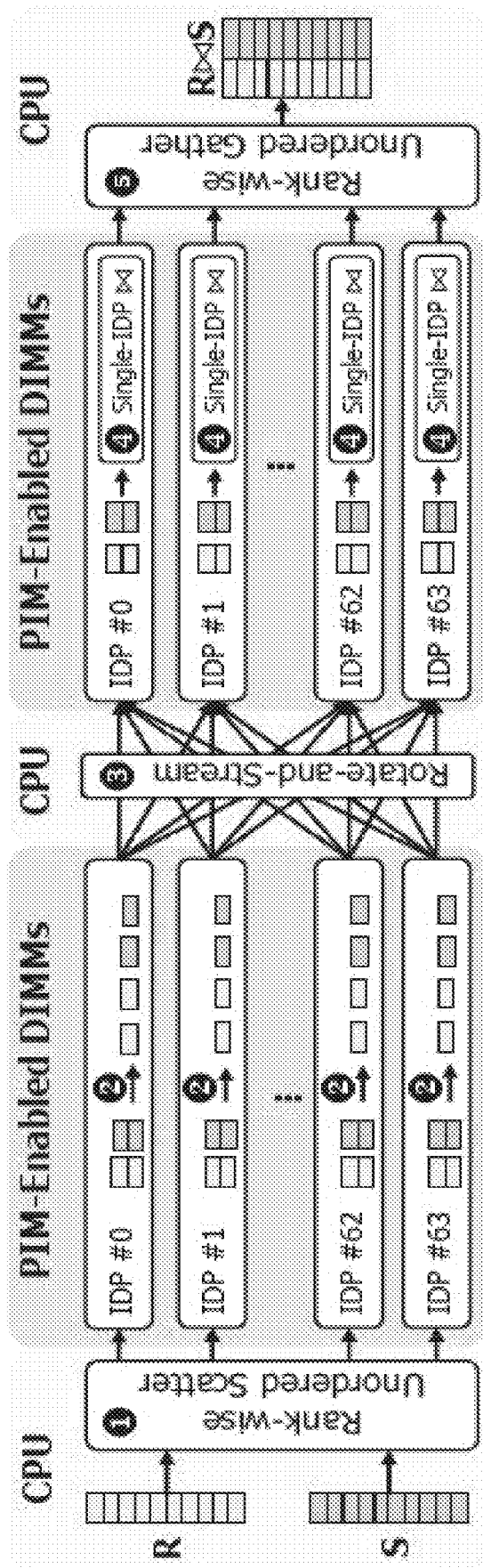
FIG. 10 is a diagram illustrating a PID-JOIN working model according to the present disclosure.

FIG. 10 is a diagram illustrating a PID-JOIN working model according to the present disclosure.

Referring to FIG. 10, the PID-JOIN scheme according to the present disclosure may perform a join operation on otwo tables R and S by performing USG and RnS operations between the CPU and the PIM-enabled DIMM.

First, the CPU performs a USG operation on the R and S tuples in the main memory and distributes them equally to the PIM-enabled DIMMs (①). Then, IDPs of the PIM-enabled DIMM perform global partitioning on their own R and S tuples to group the tuples of each partition to form packets for RnS (②). All-to-all inter-IDP communication is performed between the PIM-enabled DIMMs using RnS so that R and S tuples having the same hash key value are transmitted to the same IDP (③). Thereafter, the IDP runs a single IDP hash join algorithm on the R and S tuples and generates a result tuple of the join (④). The result tuple is transferred to the main memory through a USG operation (⑤).

The PID-JOIN scheme proposed in the present disclosure is evaluated by comparing a join execution latency of the PIM-enabled system and the existing CPU-based join algorithm of the CPU-based base system. In the case of the workload, a set of workloads derived from various prior studies on in-memory join acceleration may be used. The join performance latency is measured with two tables R and S having various numbers of tuples and Zipf coefficients. Each tuple consists of a 32-bit integer join key and a 32-bit tuple ID. In addition, a Zipf factor of S is configured with 0.00, 0.25, 0.50, and 0.75, which are representative Zipf factors used in the evaluation of join performance, to evaluate the effect of distorted tables.

First, the performance latency of the PID-JOIN scheme according to the present disclosure is compared with the CPU-based join algorithm using uniform R and S to be evaluated. Each CPU-based join algorithm selects SQLite for nest-loop join, M-PASS for sort-merge join, and PRO and PRHO for hash join. The PID-JOIN scheme includes the single IDP sort-merge and nest-loop join algorithms, in addition to the single IDP hash join algorithm. RnS and USG are applied to all three single IDP join algorithms.

Figure 11:
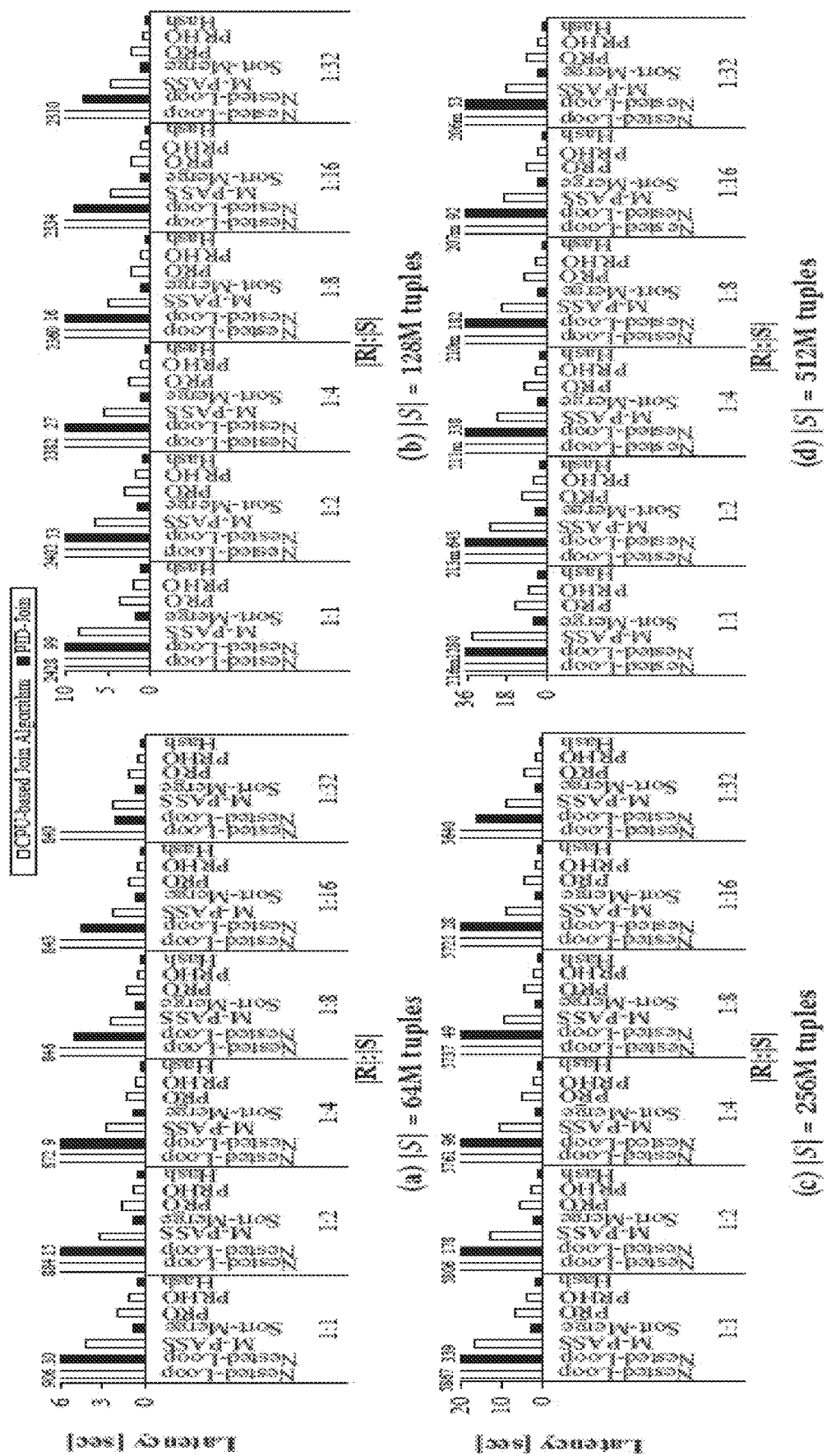
FIGS. 11 to 13 are diagrams illustrating experimental results according to the present disclosure.

FIG. 11 illustrates experimental results of the join performance latencies of the PID-JOIN scheme and CPU-based join algorithm using uniform R, S and variable |R|:|S| ratio.

Referring to FIG. 11, the experimental results show that the PID-JOIN scheme according to the present disclosure outperforms the CPU-based join algorithm in all workloads by efficiently utilizing the high internal memory bandwidth and calculation throughput of the IDP. Meanwhile, CPU-based join algorithms suffer from limited memory bandwidth in the process of transmitting data between the host CPU and main memory. The PID-JOIN scheme employing the fastest single-IDP hash join algorithm among the evaluated join algorithms achieves a geometric mean speedup of 1.92 times compared to PRHO. Referring to (a) of FIG. 11, the PID-JOIN scheme according to the present disclosure achieves an improvement in geometric mean speed of 2.27 times that of PRHO, while the improvement in speed is 1.6 times in 64 M tuples. The significant improvement in speed of the PID-JOIN scheme is mainly due to fast hash table builds and probes using the PIM-enabled DIMM.

Figure 12:
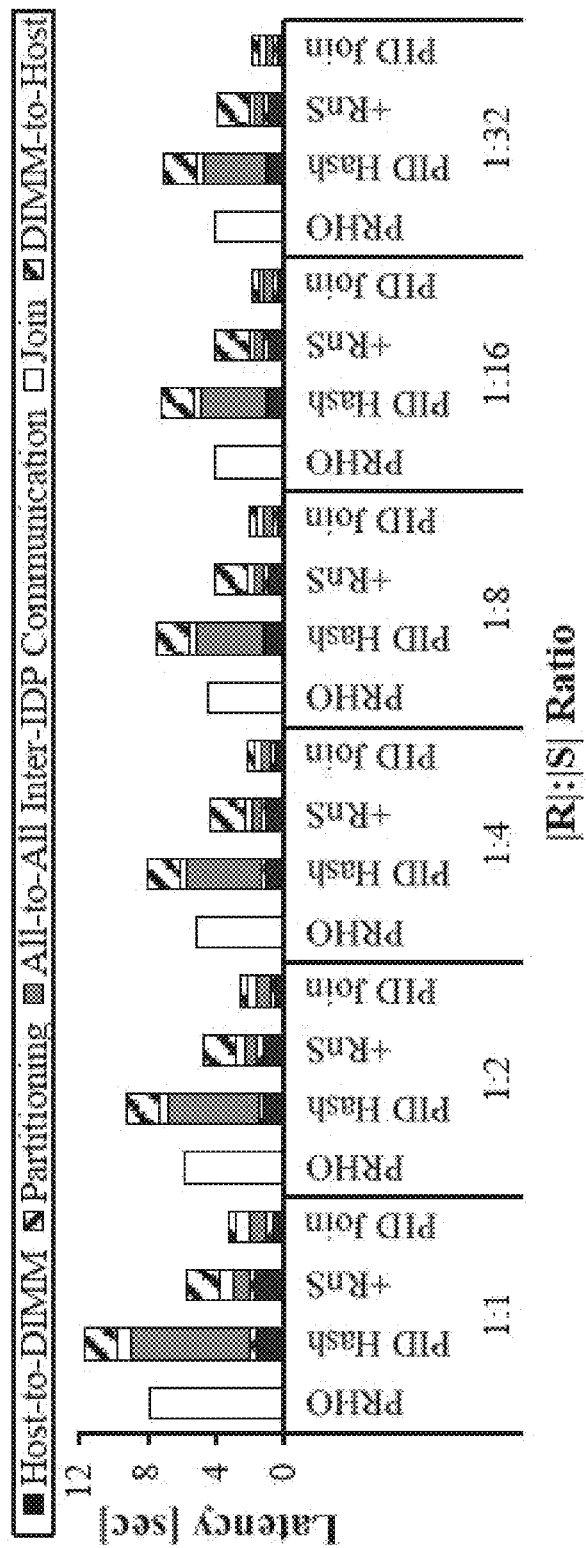
Figure 13:
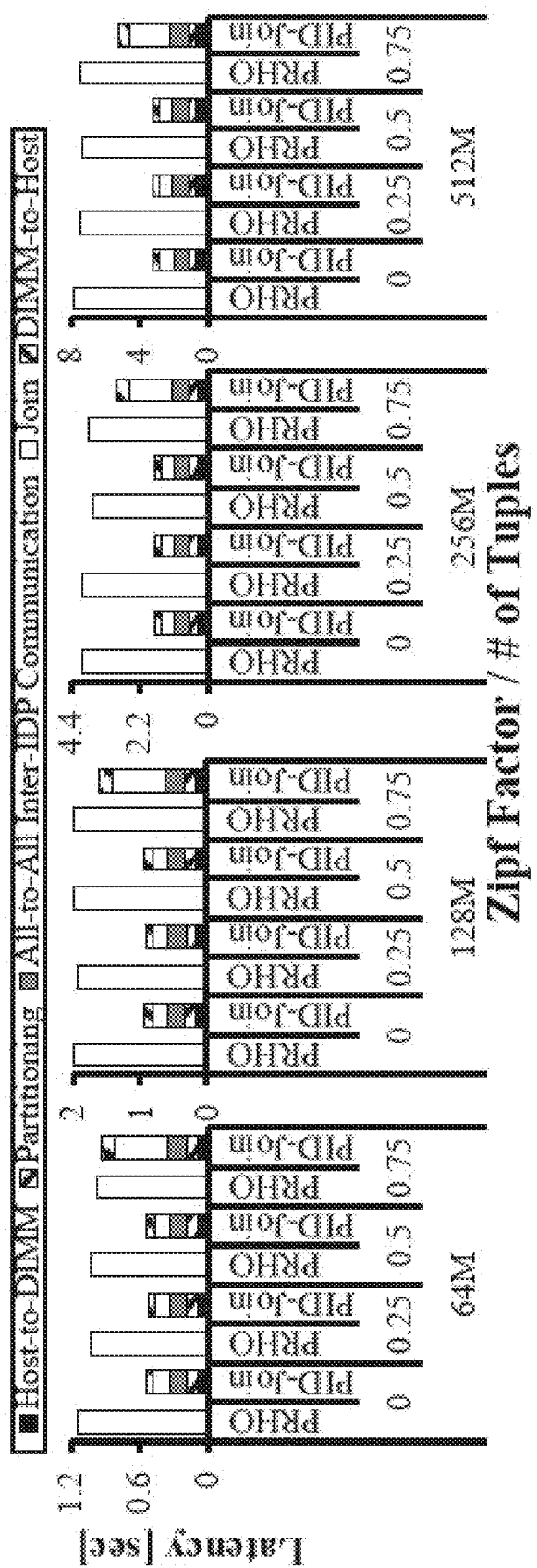

FIGS. 12 and 13 are diagrams illustrating results of analysis of join execution latency in the PID-JOIN scheme.

Referring to FIG. 12, a 1.62 times of geometric mean speed degradation is observed due to the high inter-IDP and host DIMM data transmission overhead accounting for 92.4% of the average total latency when applying only the single IDP hash join algorithm. Inter-IDP communication and host-DIMM communication are only 1.79 GB/s and 1.77 GB/s, respectively, resulting in significant latency. When RnS is applied, communication between all IDPs is optimized and the geometric mean speed is improved by 1.15 times compared to PRHO. Applying rank-specific USG optimizes host-DIMM data transmission, resulting in a 2.27 times of geometric mean speedup over PRHO. When the |R|:|S| ratio increases, R decreases because the latency of the PRHO and PID-JOIN scheme decreases. Nevertheless, the speedup remains relatively constant. In the case of the |R|:|S| ratio of 1:1, the geometric mean speed increase is 2.43 times, and in the case of 1:32, the geometric mean speed increase is 2.21 times.

The robustness of PID-JOIN may be evaluated with a distorted table by adjusting the Zipf coefficient of S from 0 to 0.75. Since the PID-JOIN scheme performs global partitioning by hashing, a load imbalance may occur between IDPs if skewness is high.

Referring to FIG. 13, it is illustrated that PID-JOIN is robust to biased tables except for the Zipf coefficient of 0.75. However, when the Zipf coefficient is 0.75, the execution latency of the PID-JOIN is maintained to be lower than that of PRHO. Meanwhile, the performance latency of PRHO slightly decreases as the Zipf coefficient increases. This is due to the increase in duplicate tuples in S. Duplicate tuples produce the same hash value and refer to the same entry in the hash table. Duplicate tuples in PID-JOIN may cause imbalance between IDPs because global partitioning allocates the duplicate tuples to the same IDP. It is expected that this load imbalance between IDPs may be mitigated by using a skew handling method that alters duplicate tuples to produce different hash values.

Next, system cost of PID-JOIN scheme according to the present disclosure are compared with system cost of the CPU-based PRHO.

For comparison, the manufacturer's suggested retail prices (MSRP) of the PIM-enabled and CPU-based base systems may be collected and added up. Thereafter, the corresponding system cost may be divided by the maximum join processing throughput (i.e., tuples/s) achieved in the experiment to obtain the system cost per performance of the two join algorithms.

As a result of comparison, PID-JOIN achieves 26.9% lower system cost per performance than PRHO. PID-JOIN achieves up to 158.4 M tuples/see on a $4,020 PIM-enabled system. However, the PRHO of the base system achieves a maximum of 65.2 M tuples/sec. The results show that PID-JOIN may be an attractive choice for RDBMS over CPU-based join algorithms.

Sensitivity Studies

Effect of Packet Size of Rotate-and-Stream (RnS)

To study the effect of the packet size of RnS on the all-to-all inter-IDP communication bandwidth, a total bandwidth, an effective bandwidth and fill rate are measured with five packet sizes (8, 16, 32, 64, and 128 bytes) in S (64 M, 128 M, 256 M, and 512 M tuples). The total bandwidth is measured as a bandwidth including null packets, while the effective bandwidth excludes null packets. Fill rate is a ratio between two bandwidth values.

Figure 14:
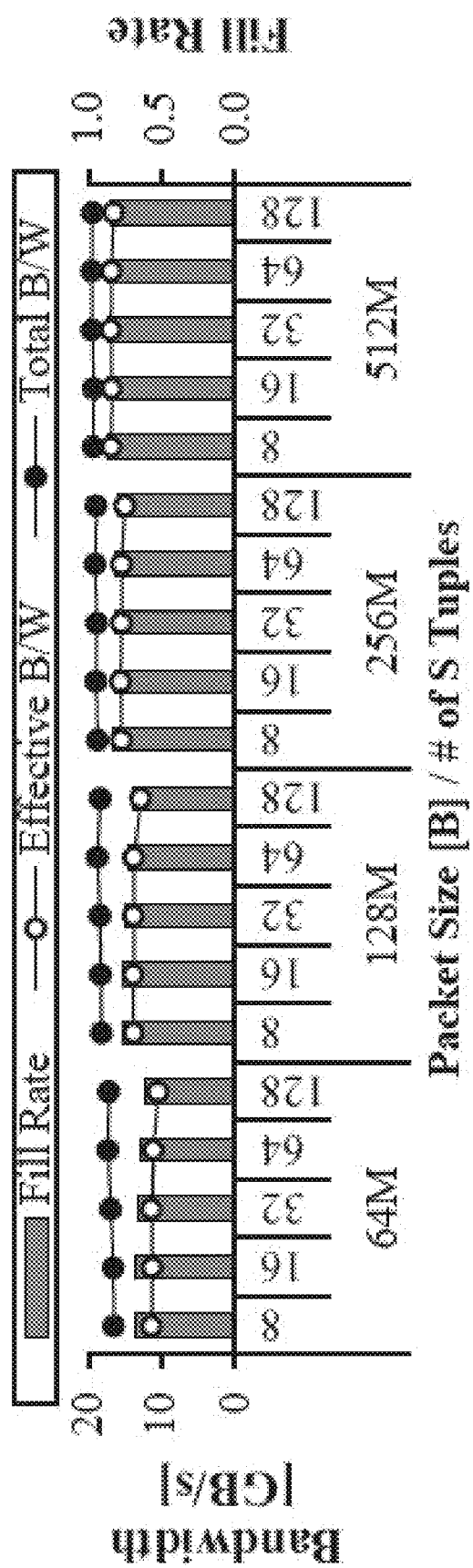
FIGS. 14 to 17B are diagrams illustrating the results of a sensitivity study according to the present disclosure.

FIG. 14 illustrates how the bandwidth of RnS changes according to the packet size. As mentioned above, RnS achieves fast inter-IDP communication by using 8-byte packets (64 bytes for a rank including 8 IDPs). Ideally, the total bandwidth has to remain constant for packet sizes greater than 8 bytes. Larger packet sizes benefit from sequential memory bank accesses. However, a larger packet size reduces the effective bandwidth slightly due to a reducioin in the fill rate.

PIM Kernel Call Overhead

The effect of PIM kernel call overhead on the throughput of PID-JOIN is analyzed. Every PIM kernel call incurs a latency overhead of about 12 ms in a PIM-enabled system. PID-JOIN calls different PIM kernels for partitioning, hash table build, and hash table search, so the overall PIM kernel call overhead remains constant. To ensure that the overhead does not offset the performance benefits of PID-JOIN, the PIM kernel has to have a sufficient amount of work to increase with respect to a table size.

Figure 15:
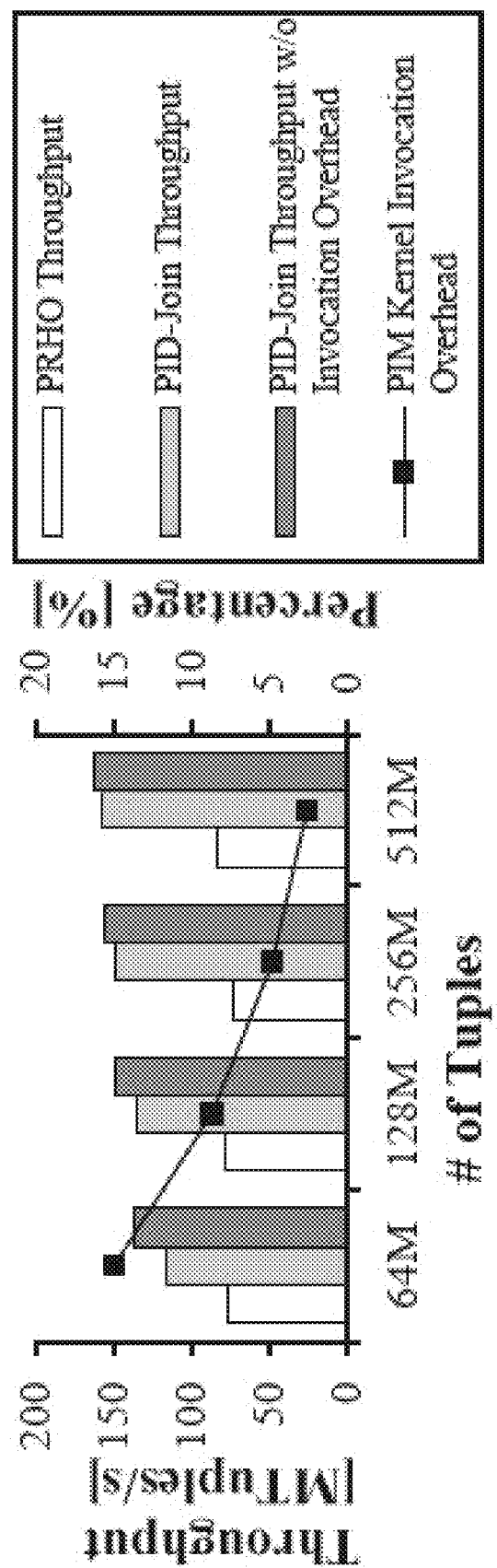

FIG. 15 illustrates the effect of the PIM kernel call overhead for different sizes of R and S. The contribution of call overhead to join execution latency decreases as the table size increases. The call overhead is negligible with 256 M tuples. However, the call overhead accounts for 14.9% with 64 M tuples. Despite the overhead, PID-JOIN still consistently outperforms PRHO for all evaluated workloads.

Conflict Handling Method

The single IDP hash join algorithm of PID-JOIN uses linear probes (LP) for collision handling. However, LP may incur significant performance overhead as the number of failed probes increases.

Figure 16:
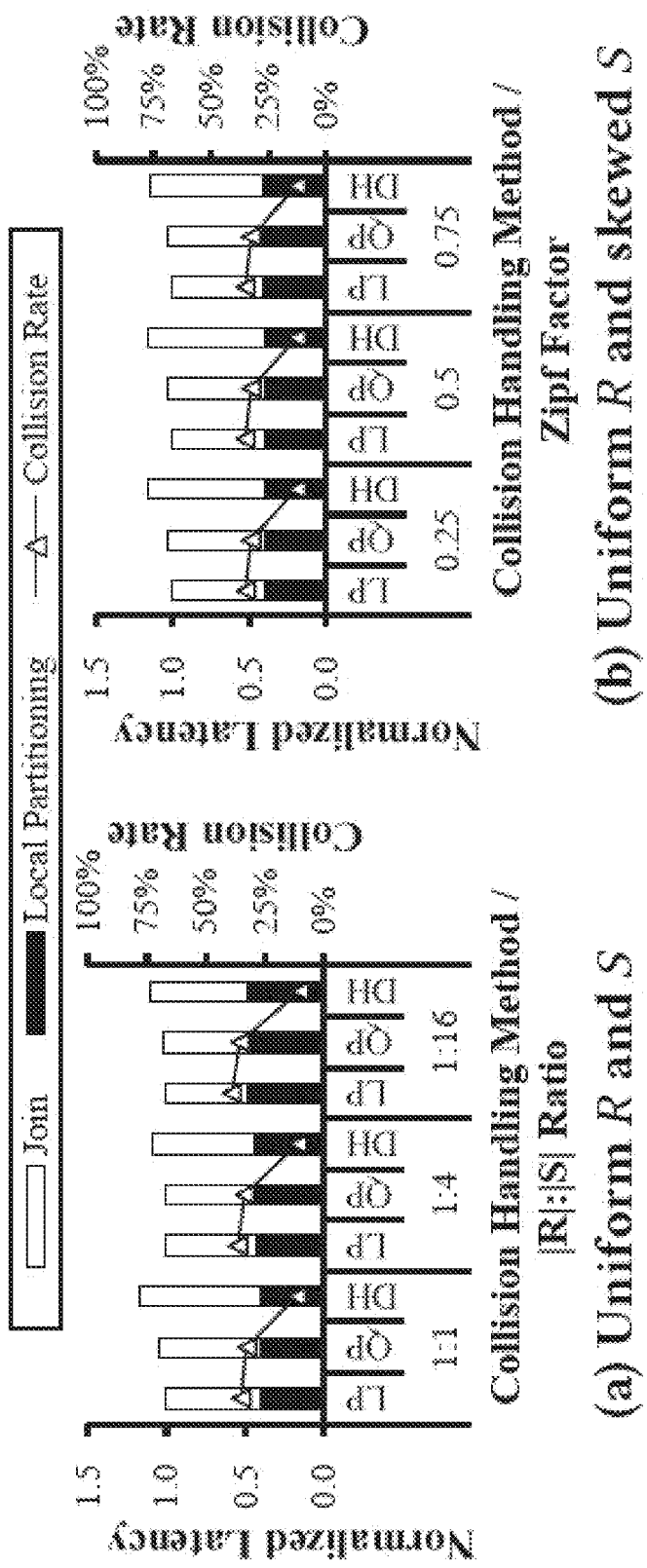

FIG. 16 illustrates execution delay analysis and collision ratio of PID-JOIN, LP, quadratic probing (QP), and double hashing (DH).

Overall, LP has a higher collision rate than QP and DH, but has the lowest execution latency. The low latency of LP is due to a low computational overhead thereof. In case of a collision, LP probes a next entry in the hash table by simply adding one to a previous key. However, QP requires integer multiplication, which is not natively supported by IDP, and DH includes an additional hash function. Due to the additional computational overhead, QP and DH have long join performance latency, and thus, LP is the fastest collision handling method. A similar trend may be observed in the distorted S.

The results also show that local partitioning accounts for up to 48.0% of the join performance latency of PID-JOIN. Local partitioning guarantees a working set of a partition to fit in WRAM by limiting the maximum number of tuples per partition, which is calculated by assuming that the tuples of the partition fill a 32 KB hash table with a fill factor of 50%. In extreme cases of skewness, local partitioning may not fit into the partitioning working set within WRAM due to excessive duplicate tuples.

Potential Improvement of Speed with TPC-H Query

The potential speedup of PID-JOIN when integrated into a complete RDBMS is probed using four single join TPC-H queries (Q4, Q12, Q14, Q19) with a scale factor of 400. For the experiment, an end-to-end query execution latency of MonetDB, a famous in-memory RDBMS, is measured in a CPU-based baseline system. Thereafter, an execution latency of a join operator is identified, the join execution latency is replaced with PID-JOIN, and an expected speedup for the query is calculated. For each query, a table used as input for the join operator is extracted according to a query plan of MonetDB. Then, PID-JOIN is performed with the table extracted from the PIM-enabled system. Host-DIMM data transmission overhead is considered, when measuring the join performance latency of PID-JOIN for a query.

Figure 17A:
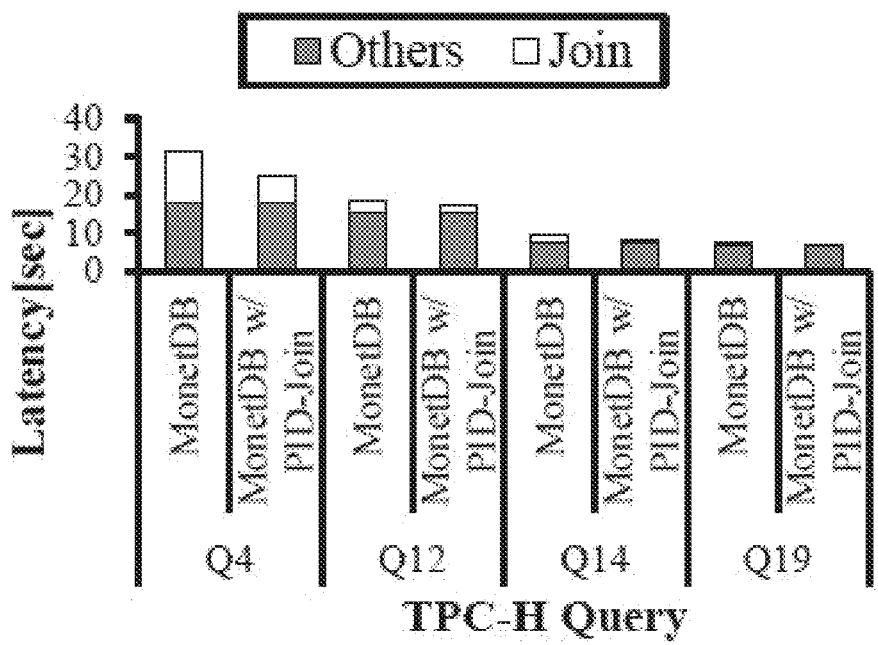
Figure 17B:
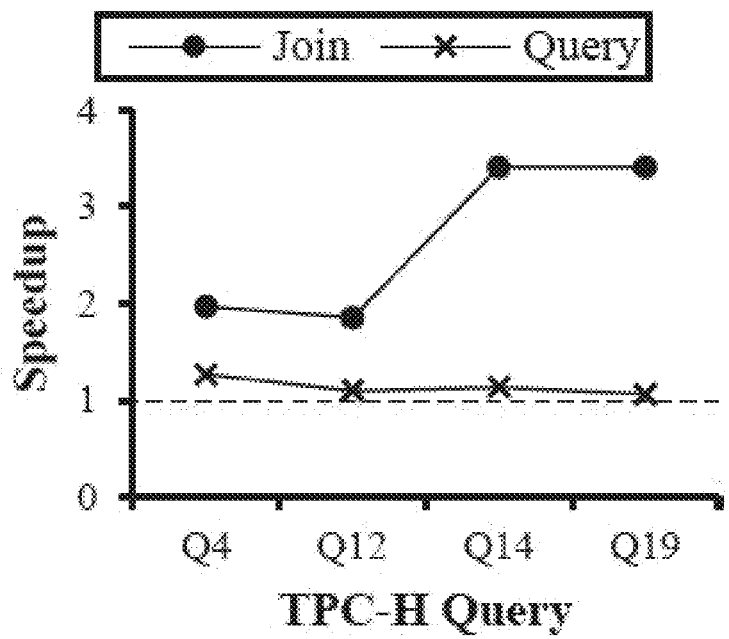

FIGS. 17A and 17B illustrate the analysis of the query execution latency of MonetDB and the expected speedup of the query when integrating PID-JOIN into MonetDB.

PID-JOIN achieves a 2.55 times of geometric mean speedup with query joins. The expected speedup of PID-JOIN augmented MonetDB is 1.14 times the geometric mean. The results show that using PID-JOIN to accelerate joins is a promising choice for in-memory RDBMS. The PID-JOIN scheme proposed in the present disclosure may take various types of PIM hardware besides PIM-enabled DIMM.

The PID-JOIN scheme proposed in the present disclosure may maximize join throughput in the IDP by using the distributed and partitioned hash join algorithms, utilize a high internal memory bandwidth and calculation throughput of the DIMM by performing global partitioning of two tables in the DIMM, instead of CPU, and minimize the performance overhead of inter-IDP communication by using CPU cache streaming and vector commands in the all-to-all inter-IDP communication process related to the CPU. In addition, the PID-JOIN scheme proposed in the present disclosure may minimize a data transmission latency between the CPU and the DIMM and accelerate data transmission.

Although the above has been described with reference to preferred embodiments of the present disclosure, those skilled in the art will variously modify and change the present disclosure within the scope not departing from the spirit and scope of the present disclosure described in the claims below.

What is claimed is:

1. A processing-in-memory (PIM)-based computing device comprising:
a main memory configured to store first and second data sets;
a PIM module configured as an in-line memory module including a memory processor, a working memory, and a memory bank, the memory processor being connected to the working memory and performing a join operation on the first and second data sets loaded into the working memory; and
a processor configured to form first and second channels with the main memory and the PIM module, import the first and second data sets through the first channel, and store the first and second data sets in the memory bank through the second channel,
wherein the memory processor performs nest-loop join by loading the first and second data sets in the memory bank into the working memory and independently performing an internal loop operation for each set, and
wherein the performing of the nest-loop join includes an outer loop scanning the second data set and an inner loop scanning the first data set, checking a buffer amount of the working memory required to store the first data set and allocating a circular buffer to the working memory to store the first and second data sets, loading the second data set in the working memory, filling the circular buffer with the first data set, and performing the join operation on the first and second data sets.

2. The PIM-based computing device of claim 1, wherein the PIM module implements the in-line memory module as a plurality of dual in-line memory modules to support a scale-out join operation.

3. The PIM-based computing device of claim 2, wherein the PIM module sub-groups the plurality of dual in-line memory modules and connects the sub-group of the plurality of dual in-line memory modules to one of the second channels.

4. The PIM-based computing device of claim 2, wherein the PIM module performs global partitioning through inter data relocation between the plurality of dual in-line memory modules to arrange the first and second data sets.

5. The PIM-based computing device of claim 4, wherein the PIM module performs a rotate-and-stream (RnS) operation on data in the memory bank of each of the plurality of dual in-line memory modules in the inter data relocation process.

6. The PIM-based computing device of claim 5, wherein the PIM module performs the RnS operation by transmitting and receiving a specific data set in units of data sets between the plurality of dual in-line memory modules.

7. The PIM-based computing device of claim 4, wherein the processor performs an unordered scatter-gather (USG) operation on the first and second data sets in the main memory before performing the global partitioning and stores the corresponding first and second data sets in the memory bank.

8. The PIM-based computing device of claim 7, wherein the processor distributes the first and second data sets to the memory bank by performing stream transpose send (STS) procedures in the USG operation.

9. The PIM-based computing device of claim 1, wherein the memory processor selects hash join, sort-merge join, or nest-loop join as the join operation.

10. The PIM-based computing device of claim 1, wherein the memory processor generates a hash table in the working memory, performs local partitioning by loading the first and second data sets in the memory bank into the working memory, and performs hash join by associating the corresponding first and second data sets with the hash table using a hash function.

11. The PIM-based computing device of claim 1, wherein the memory processor performs sort-merge join by performing range partitioning, parallel in-place sort, and parallel merge on the first and second data sets in the memory bank.

12. A processing-in-memory (PIM)-based computing device comprising:
a main memory configured to store first and second raw data sets;
a plurality of processing-in-memory (PIM) modules each configured as an in-line memory module including a memory processor, a working memory, and a memory bank, the memory processor being connected to the working memory and performing a join operation on first and second processing data sets loaded into the working memory; and a processor configured to preprocess the first and second raw data sets and store the preprocessed first and second raw data sets in the memory bank, wherein the memory processor performs nest-loop join by loading the first and second raw data sets in the memory bank into the working memory and independently performing an internal loop operation for each set, and wherein the performing of the nest-loop join includes an outer loop scanning the second raw data set and an inner loop scanning the first raw data set, checking a buffer amount of the working memory required to store the first raw data set and allocating a circular buffer to the working memory to store the first and second raw data sets, loading the second raw data set in the working memory, filling the circular buffer with the first raw data set, and performing the join operation on the first and second raw data sets.

13. The PIM-based computing device of claim 12, wherein the processor performs an unordered scatter-gather (USG) operation on the first and second raw data sets in the main memory and store the corresponding first and second raw data sets in the memory bank.

14. The PIM-based computing device of claim 12, wherein the plurality of PIM modules arrange the first and second processing data sets through inter data relocation for the preprocessed first and second raw data sets.

15. The PIM-based computing device of claim 14, wherein the plurality of PIM modules perform a rotate-and-stream (RnS) operation on the preprocessed first and second raw data sets in the inter data relocation.

* * * * *